US012744566B2

(12) United States Patent
Shental et al.

(10) Patent No.: US 12,744,566 B2
(45) Date of Patent: Sep. 22, 2026

(54) UNSOURCED RANDOM ACCESS VIA CHANNEL CLUSTERING IN ORTHOGONAL TIME FREQUENCY SPACE DOMAIN

(71) Applicant: QUALCOMM Incorporated, San Diego, CA (US)

(72) Inventors: Ori Shental, Marlboro, NJ (US); Jing Sun, San Diego, CA (US); Junyi Li, Greentown, PA (US); Jing Jiang, San Diego, CA (US); Wei Yang, San Diego, CA (US); Tao Luo, San Diego, CA (US); Raviteja Patchava, San Diego, CA (US); Xiaoxia Zhang, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 76 days.

(21) Appl. No.: 18/661,515

(22) Filed: May 10, 2024

(65) Prior Publication Data

US 2025/0350326 A1 Nov. 13, 2025

(51) Int. Cl.
*H04B 7/0456* (2017.01)
*H04W 72/0446* (2023.01)

(52) U.S. Cl.
CPC ...... *H04B 7/0478* (2013.01); *H04W 72/0446* (2013.01)

(58) Field of Classification Search
CPC .................................................... H04B 7/0478
USPC .......................................................... 375/267
See application file for complete search history.

(56) References Cited

U.S. PATENT DOCUMENTS

2005/0237236 A1* 10/2005 Budic ................. G01S 13/5244 342/159
2017/0317732 A1* 11/2017 Wang .................... H04J 13/004
2018/0231636 A1* 8/2018 Maher ...................... G01S 13/06
2024/0088970 A1* 3/2024 Sun ...................... H04B 7/0632

OTHER PUBLICATIONS

Deka K., et al., "OTFS-SCMA: A Code-Domain NOMA Approach for Orthogonal Time Frequency Space Modulation", IEEE Transactions on Communications, IEEE Service Center, Piscataway, NJ, USA, vol. 69, No. 8, Apr. 23, 2021 , pp. 5043-5058, XP011871584, p. 5048-p. 5049, figure 6.
International Search Report and Written Opinion—PCT/US2025/025019—ISA/EPO—Jul. 11, 2025 (2402359WO).
Qi C., et al., "Key Issues in Wireless Transmission for NTN-Assisted Internet of Things", IEEE Internet of Things Magazine, IEEE, vol. 7, No. 1, Jan. 1, 2024, pp. 40-46, XP011958160, pp. 40, 42.

* cited by examiner

*Primary Examiner* — Lihong Yu
(74) *Attorney, Agent, or Firm* — Holland & Hart LLP

(57) ABSTRACT

Methods, systems, and devices for unsourced random access via channel clustering in orthogonal time frequency space domain are described. Multiple user equipments (UEs) may transmit encoded message segments according to randomly selected coding sequences from a codebook. UEs may transmit the message segments over a series of slots. A network entity may identify the coding sequences for each message segment and assign each message segment to a respective delay Doppler domain cluster based on message segments having a same or similar time delay and Doppler shift. The network entity may then identify each message by combining the messages segments of each delay Doppler domain cluster and decoding the message.

28 Claims, 10 Drawing Sheets

UNSOURCED RANDOM ACCESS VIA CHANNEL CLUSTERING IN ORTHOGONAL TIME FREQUENCY SPACE DOMAIN

FIELD OF TECHNOLOGY

The following relates to wireless communications, including unsourced random access via channel clustering in orthogonal time frequency space domain.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein. The described techniques relate to improved methods, systems, devices, and apparatuses that support unsourced random access via channel clustering in orthogonal time frequency space domain. For example, the described techniques provide for a first wireless device (e.g., a network entity) to communicate with multiple second wireless devices (e.g., user equipments (UEs)). To transmit larger messages, the UEs may divide messages into smaller message segments, and encode each message segment according to a coding sequence. The coding sequences may be indicated as part of a codebook from the network entity.

The network entity may obtain (e.g., receive), from multiple UEs, multiple message segments within a same frequency band. The message segments may not have an identifier, such that the network entity may not be able to distinguish which message segment corresponds to which message. To identify and decode the messages, the network entity may assign each message segment to respective delay-Doppler domain cluster of multiple delay-Doppler domain clusters and identify the coding sequences used by the UE to encode each message segment. A first set of multiple message segments of the multiple message segments received from the UEs may be associated with, or assigned, to a first delay-Doppler domain cluster. The first set of multiple message segments collectively form a first message, where the first message is associated with a respective UE of the multiple UEs. The network entity may identify which coding sequence corresponds to each message segment and decode the first message including the first set of multiple message segments assigned to the first delay-Doppler domain cluster. In some examples, the network entity may decode a second message made of a second set of multiple message segments assigned to a second delay-Doppler domain cluster.

A method for wireless communications by a first wireless device is described. The method may include obtaining, from a set of multiple second wireless devices, a set of multiple message segments via a set of multiple slots, assigning each message segment of the set of multiple message segments to a respective delay-Doppler (DD) domain cluster of a set of multiple DD domain clusters, where a first set of multiple message segments of the set of multiple message segments associated with a first DD domain cluster of the set of multiple DD domain clusters collectively forms a first message associated with a second wireless device of the set of multiple second wireless devices, and decoding the first message including the first set of multiple message segments based on a codebook shared with the set of multiple second wireless devices, the codebook based on a quantity of delay bins and a quantity of Doppler bins.

A first wireless device for wireless communications is described. The first wireless device may include one or more memories storing processor executable code, and one or more processors coupled with the one or more memories. The one or more processors may individually or collectively be operable to execute the code to cause the first wireless device to obtain, from a set of multiple second wireless devices, a set of multiple message segments via a set of multiple slots, assign each message segment of the set of multiple message segments to a respective delay-Doppler (DD) domain cluster of a set of multiple DD domain clusters, where a first set of multiple message segments of the set of multiple message segments associated with a first DD domain cluster of the set of multiple DD domain clusters collectively forms a first message associated with a second wireless device of the set of multiple second wireless devices, and decode the first message including the first set of multiple message segments based on a codebook shared with the set of multiple second wireless devices, the codebook based on a quantity of delay bins and a quantity of Doppler bins.

Another first wireless device for wireless communications is described. The first wireless device may include means for obtaining, from a set of multiple second wireless devices, a set of multiple message segments via a set of multiple slots, means for assigning each message segment of the set of multiple message segments to a respective delay-Doppler (DD) domain cluster of a set of multiple DD domain clusters, where a first set of multiple message segments of the set of multiple message segments associated with a first DD domain cluster of the set of multiple DD domain clusters collectively forms a first message associated with a second wireless device of the set of multiple second wireless devices, and means for decoding the first message including the first set of multiple message segments based on a codebook shared with the set of multiple second wireless devices, the codebook based on a quantity of delay bins and a quantity of Doppler bins.

A non-transitory computer-readable medium storing code for wireless communications is described. The code may include instructions executable by one or more processors to obtain, from a set of multiple second wireless devices, a set of multiple message segments via a set of multiple slots, assign each message segment of the set of multiple message segments to a respective delay-Doppler (DD) domain cluster of a set of multiple DD domain clusters, where a first set of multiple message segments of the set of multiple message segments associated with a first DD domain cluster of the set of multiple DD domain clusters collectively forms a first message associated with a second wireless device of the set of multiple second wireless devices, and decode the first message including the first set of multiple message segments based on a codebook shared with the set of multiple second wireless devices, the codebook based on a quantity of delay bins and a quantity of Doppler bins.

Some examples of the method, first wireless devices, and non-transitory computer-readable medium described herein may further include operations, features, means, or instructions for outputting a control message indicating the codebook including a set of multiple coding sequences, where the first DD domain cluster may be associated with a set of coding sequences of the set of multiple coding sequences.

In some examples of the method, first wireless devices, and non-transitory computer-readable medium described herein, a first message segment of the first set of multiple message segments may be coded using a first coding sequence of the set of coding sequences and a second message segment of the first set of multiple message segments may be coded using a second coding sequence of the set of coding sequences.

In some examples of the method, first wireless devices, and non-transitory computer-readable medium described herein, the first coding sequence and the second coding sequence may be randomly selected sequences from a column of the set of coding sequences.

Some examples of the method, first wireless devices, and non-transitory computer-readable medium described herein may further include operations, features, means, or instructions for determining a time delay and a Doppler shift for each respective message segment of the set of multiple message segments and assigning each message segment of the set of multiple message segments to a respective DD cluster of the set of multiple DD clusters based on the determined time delay and Doppler shift for each respective message segment, where each DD cluster corresponds to a respective wireless device of the set of multiple second wireless devices.

In some examples of the method, first wireless devices, and non-transitory computer-readable medium described herein, a quantity of the first set of multiple message segments may be based on a quantity of the set of multiple slots.

In some examples of the method, first wireless devices, and non-transitory computer-readable medium described herein, the first wireless device may be a network entity, and the set of multiple second wireless devices includes a set of multiple user equipments.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
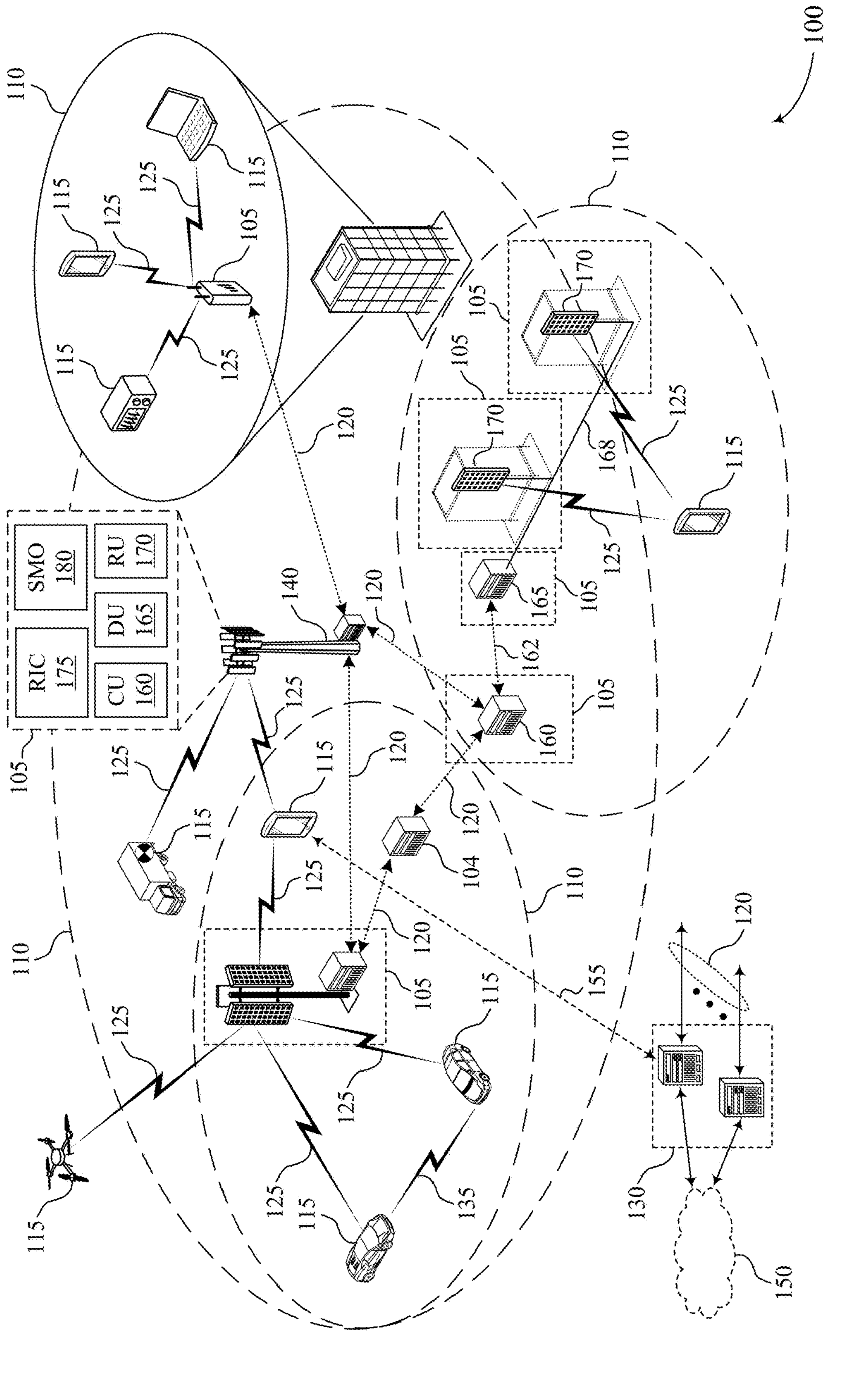
FIG. 1 shows an example of a wireless communications system that supports unsourced random access via channel clustering in orthogonal time frequency space domain in accordance with one or more aspects of the present disclosure.

Wireless communications devices, such as network entities and user equipments (UEs), may perform various access procedures to facilitate communications, such as unsourced random access (URA). URA allows uncoordinated access of a smaller group of sporadically active users (e.g., UEs) from a large pool of candidates. In some examples, all, or a significant portion, of the UEs share the same sequence codebook for the encoding of messages to transmit relatively short messages. As part of the URA procedure, the network entity may not allocate unique resources to each UE but instead may allocate a resource pool that the UEs may use when a particular UE has data to transmit. When transmitting, a UE may randomly select a coding sequence from the codebook and transmit a short, encoded message to the network entity without receiving an individual resource allocation. However, for longer messages, a much larger codebook is required, as the length of the message corresponds to the size of the codebook. A large codebook may require significant resources, making message communication inefficient and ineligible compressed sensing.

To transmit longer messages, in some methods, the UE may divide the message into smaller segments. The UE may randomly select coding sequences from the codebook. The UE may encode each message segment using a randomly selected coding sequence and transmit each message segment to the network entity. The message segments may be received and compiled by the network entity. However, as the message segments may not contain UE identifiers, a network entity receiving multiple message segments from multiple UEs may not be able to correctly decode and identify which message segments correspond to the same message. Additional coding steps may be included at the UE and the network entity, but such methods may be resource intensive and inefficient.

Techniques described herein provide for URA via delay Doppler domain clustering, such that the network entity may identify and combine message segments sent from multiple UEs. One or more UEs may split a message into message segments, encode each message segment according to a respective coding sequence selected from a codebook, and transmit each encoded message segment to the network entity over a set of slots within a same frequency band. The network entity may receive, via the set of slots, multiple encoded message segments from multiple UEs. A first subset of message segments transmitted by a first UE may experience similar time shifts (delay) and frequency shifts (Doppler shift). For example, a network entity may receive message segments from a first UE which all have similar time delays in the time the message takes from the first UE to the network entity. Additionally, the network entity may receive message segments from the first UE which all have similar changes in frequency due to the relative motion between the first UE and the network entity. This effect is known as the Doppler effect. In some instances, a Fourier transform may be used to convert time-domain signals into frequency-domain signals. These transformed signals can then be represented as a 2D graph, where one axis represents delay and the other axis represents Doppler shift. This graphical representation is often referred to as a delay Doppler map.

The network entity may cluster the message segments in a delay Doppler map by assigning each message segment to a cluster (e.g., subset, group) of a set of multiple different clusters according to a respective time delay and Doppler shift of each message segment. A subset of message segments that are all associated with a similar time delay and Doppler shift are assumed by the network entity to be transmitted by the first UE, rather than other UEs of the multiple UEs. The network entity may similarly cluster message segments from the other UEs into other clusters, thereby indicating to the network entity which message segments are sent from a respective UE. The network entity may stitch, combine, or otherwise compile the message segments of each cluster according to the order the message segments were received over the set of slots, and decode each segment according to the codebook. The network entity may identify which coding sequence corresponds to each respective encoded message segment and decode each message segment accordingly. The network entity may match each decoded message segment to the assigned cluster and order the decoded message segments according to their respective slots. As each cluster may be associated with a different UE, the network entity may thus identify each message from each UE.

Aspects of the disclosure are initially described in the context of wireless communications systems. Aspects of the disclosure are further illustrated by and described with reference to message diagrams and a process flow diagram. Aspects of the disclosure are further illustrated by and described with reference to apparatus diagrams, system diagrams, and flowcharts that relate to unsourced random access via channel clustering in orthogonal time frequency space domain.

FIG. 1 shows an example of a wireless communications system 100 that supports unsourced random access via channel clustering in orthogonal time frequency space domain in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s)

120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Techniques described herein provide for unsourced random access (URA) via delay Doppler domain clustering, such that network entity 105 may identify and combine message segments sent from multiple UEs 115. Network entity 105 may transmit a control message indicating a codebook to multiple UEs 115. UEs 115 may each divide a message into message segments, encode each message segment according to coding sequences of the codebook, and transmit each message segment to network entity 105 over a set of slots. Network entity 105 may receive, via the set of slots, the multiple message segments from the multiple UEs 115. In some examples, the message segments are transformed into frequency-domain signals. These transformed signals can then be represented on a delay-Doppler map where one axis represents delay and the other axis represents Doppler shift.

Network entity 105 may utilize the delay-Doppler map to determine a clustering of message segments on the map. Network entity 105 may stitch, combine, or otherwise compile the message segments of each cluster according to the order they were received over the set of slots, and decode each segment according to the codebook. Each cluster may correspond to a set of message segments transmitted by a particular UE 115. Techniques are further described herein.

Figure 2:
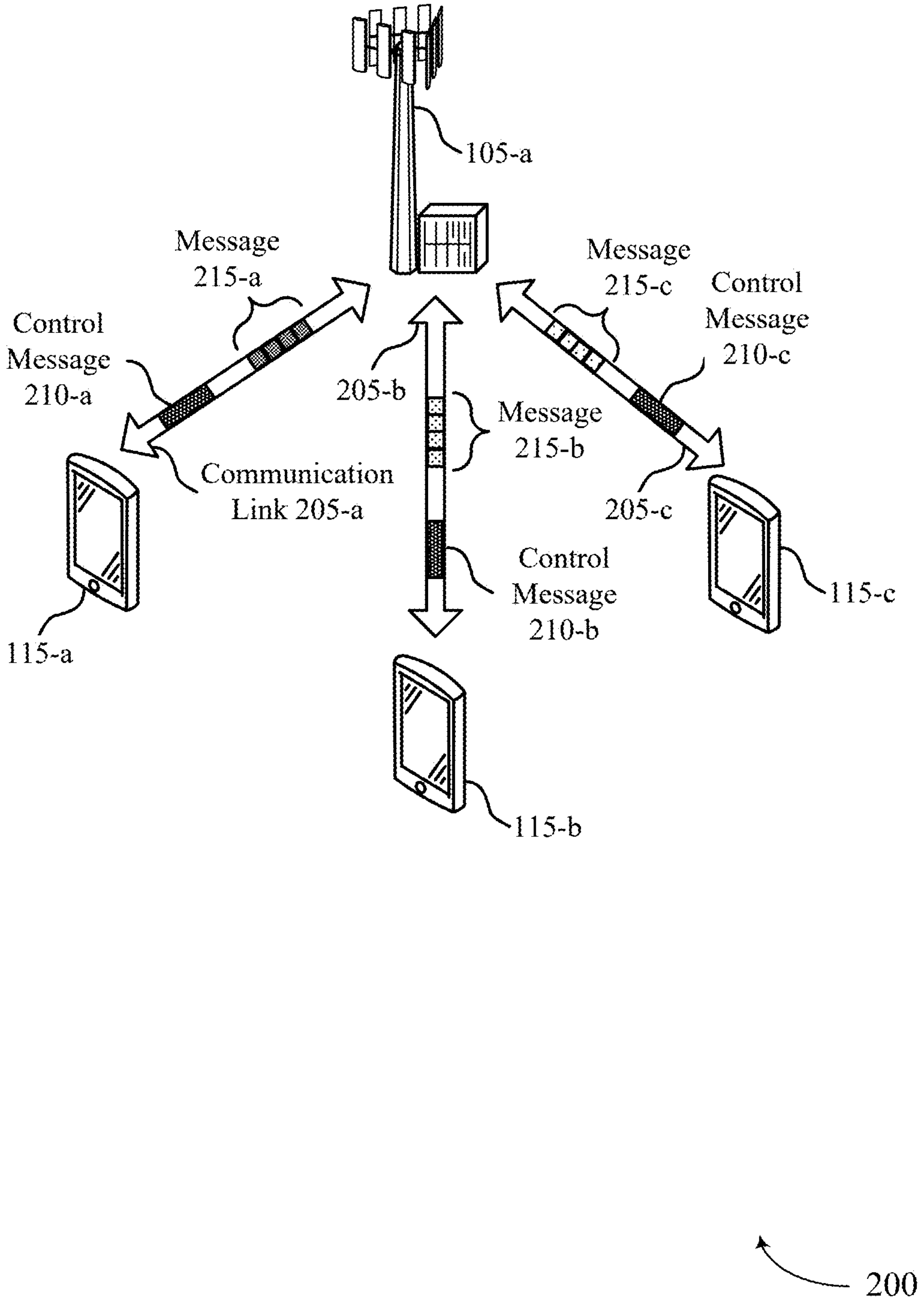
FIG. 2 shows an example of a wireless communications system that supports unsourced random access via channel clustering in orthogonal time frequency space domain in accordance with one or more aspects of the present disclosure.

FIG. 2 shows an example of a wireless communications system 200 that supports unsourced random access via channel clustering in orthogonal time frequency space domain in accordance with one or more aspects of the present disclosure. Specifically, the wireless communications system 200 describes a network entity 105-*a* communicating with UE 115-*a*, UE 115-*b*, and UE 115-*c*. UEs 115 may be examples of active users communicating via URA. The wireless communications system 200 may implement or be implemented by one or more aspects of the wireless communications system 100. Network entity 105-*a* may be an example of network entity 105 as described with reference to FIG. 1, and UEs 115 may be examples of UE 115 as described with reference to FIG. 1. While illustrated with reference to network entity 105 and UEs 115, the techniques described herein may be performed by other wireless communications devices.

Network entity 105-*a* (e.g., a first wireless communications device) may communicate one or more control messages 210 and one or more messages 215 to UEs 115 (e.g., second wireless communications devices) via one or more communication links 205. For example, network entity 105-*a* may transmit a control message 210-*a* to UE 115-*a* and UE 115-*a* may communicate a message 215-*a* to network entity 105-*a* via the communication link 205-*a*. Network entity 105-*a* may transmit a control message 210-*b* to UE 115-*b* and UE 115-*b* may communicate a message 215-*b* to network entity 105-*a* via the communication link 205-*b*. Network entity 105-*a* may transmit a control message 210-*c* to UE 115-*c* and UE 115-*c* may communicate a message 215-*c* to network entity 105-*a* via the communication link 205-*c*. The messages 215 may be divided (e.g., split) into segments and transmitted over a set of slots.

UEs 115 may be a smaller portion of a larger pool of users as a part of URA. URA is method of communication between a network (e.g., network entity 105-*a*) and a large pool of users (e.g., UEs 115). URA allows for the potential concurrent, sporadic, and uncoordinated access of active UEs 115 (e.g., users) from a very large pool of UEs 115 (e.g., candidates). For example, the pool may include more than millions of UEs 115, and the smaller pool of active UEs 115 may be less than 1% of the total UEs 115. One application of URA is massive URA, where the network entity is equipped with many receiving antennas. Generally, all UEs 115 share the same codebook (e.g., indicated via the control message 210). The codebook may include coding sequences for encoding messages. UEs 115 may transmit the messages 215 without being assigned dedicated resources.

Techniques described herein provide for network entity 105-*a* to combine message segments to decode messages 215 by determining a time delay and Doppler shift for each message segment. Multiple UEs 115 may transmit encoded message segments according to randomly selected coding sequences from a codebook. UEs 115 may transmit the message segments over a series of slots. Network entity 105-*a* may identify the coding sequences for each message segment and assign each message segment to a respective delay Doppler domain cluster based on message segments having a same or similar time delay and Doppler shift. Network entity 105-*a* may then identify each message by combining the messages segments of each delay Doppler domain cluster and decoding the message.

Figure 3:
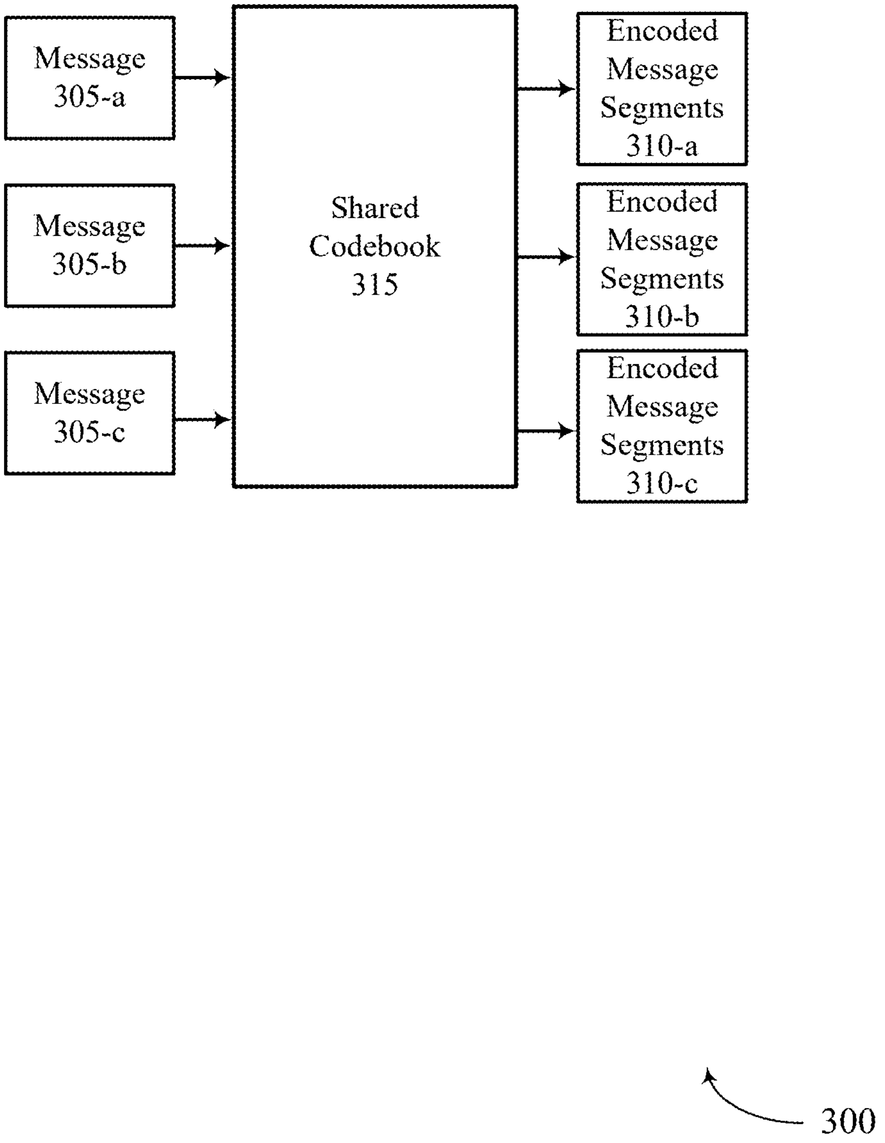
FIG. 3 shows an example of a message diagram that supports unsourced random access via channel clustering in orthogonal time frequency space domain in accordance with one or more aspects of the present disclosure.

FIG. 3 shows an example of a message diagram 300 that supports unsourced random access via channel clustering in orthogonal time frequency space domain in accordance with one or more aspects of the present disclosure. Specifically, the message diagram 300 describes communications at a UE, where the UE transmits messages 305 after splitting and encoding them. The message diagram 300 may implement, or be implemented by, one or more aspects of the wireless communications system 100, the wireless communications system 200, or a combination thereof.

Active UEs, such as a part of URA, may transmit one or more messages to a network entity according to configuration, or control signaling, received from a network entity. The signaling from the network entity may include a shared codebook 315 for the UEs to use to encode the messages 305. The network entity may transmit a control message to the UEs to indicate a frequency band and a series of slots for the UEs to use for transmitting messages.

In some examples, multiple UEs may each divide a message into message segments. For example, a first UE may plan to transmit a first message 305-*a*, a second UE may plan to transmit a second message 305-*b*, and a third UE may plan to transmit a third message 305-*c*. The messages 305 may be segmented into respective sets of message segments. A UE may randomly select a coding sequence from shared codebook 315 for encoding each message segment.

UEs may randomly select a coding sequence out of shared codebook 315. Shared codebook 315 may be in the delay Doppler domain with the size $M_dN_D \times 2^J$ where $M_d$ is the number of delay bins, $N_D$ is the number of Doppler bins, and J is the number of bits of a message segment. The number of J bits of a message segment may be B/L bits, where B is a bit length of a message being encoded and L is the number of slots over which the message may be transmitted. The quantity of the message segments may correspond to the quantity of slots per transmission. For example, a message of 50 bits may be segmented into 5 message segments of 10 bits each, to be transmitted over 5 consecutive slots, and the coding sequences may have lengths of 10 bits each.

Shared codebook 315 may include $2^J$ columns and $M_dN_D$ rows and may be a Gaussian matrix, a quadrature phase shift keying matrix, a Zaoff-Chu matrix, or any other similar sequences. Each column of shared codebook 315 may be a unique coding sequence, and each column may have a different set of values that a UE may apply to encode a message segment. Shared codebook 315 may be constructed such that there are up to a number of P paths between a UE and network entity.

The UE may encode each message segment according to the randomly selected coding sequence, generating encoded message segments 310. For example, the message 305-*a* may be segmented where each segment is encoded to create an encoded message segments 310-*a*, the message 305-*b* may be segmented where each segment is encoded to create an encoded message segments 310-*b*, and the message 305-*c* may be segmented where each segment is encoded to create an encoded message segments 310-*c*. The UE may modulate the message segments over the $M_dN_D$ grid bins and output $M_dN_D$ delay Doppler resource elements. UEs (e.g., active users) may transmit respective encoded message segments 310 of a message via a series of consecutive slots to a network entity.

Figure 4:
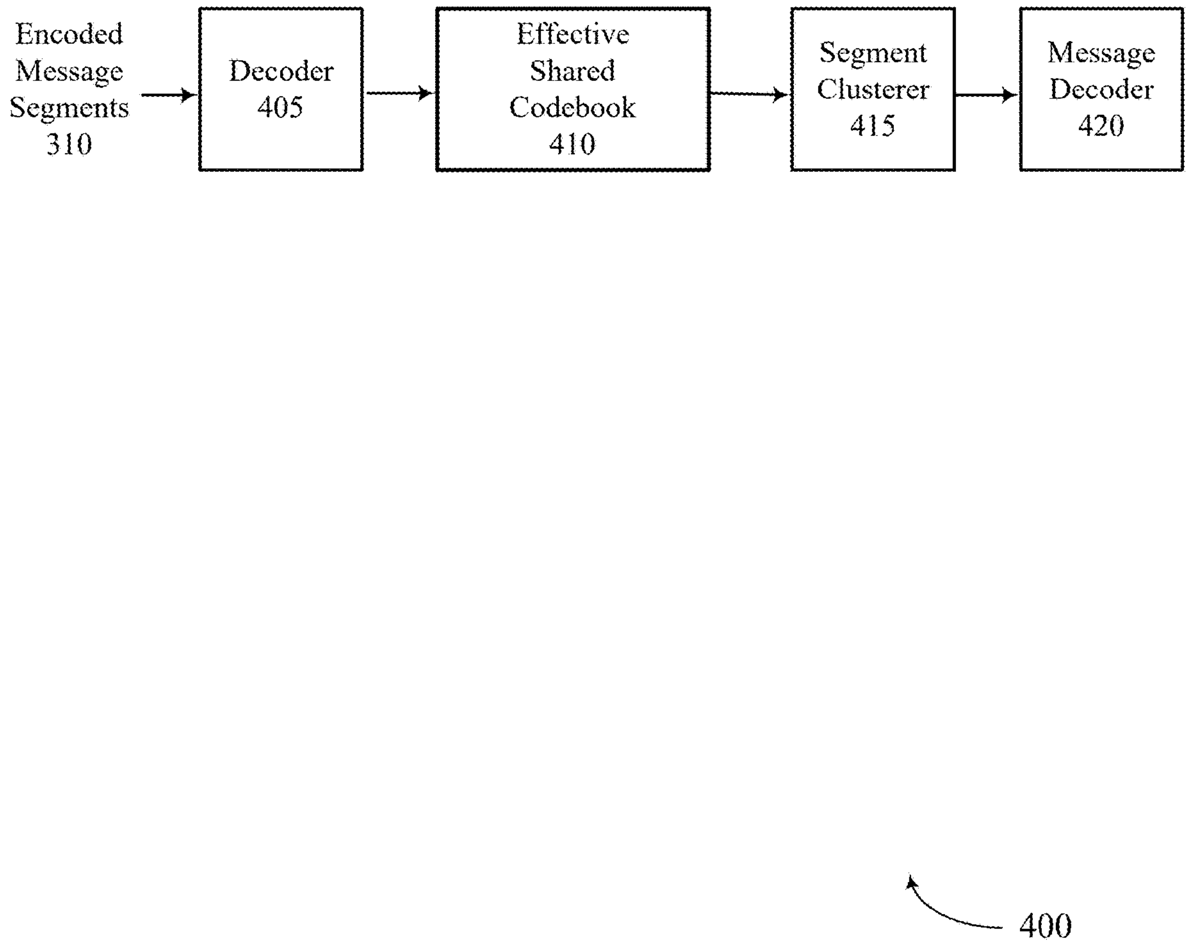
FIG. 4 shows an example of a message diagram that supports unsourced random access via channel clustering in orthogonal time frequency space domain in accordance with one or more aspects of the present disclosure.

FIG. 4 shows an example of a message diagram 400 that supports unsourced random access via channel clustering in orthogonal time frequency space domain in accordance with one or more aspects of the present disclosure. Specifically, the message diagram 400 describes communications at a network entity, where the network entity may receive encoded message segments 310 from a UE. The message diagram 400 may implement, or be implemented by, one or more aspects of the wireless communications system 100, the wireless communications system 200, or a combination thereof.

The network entity may receive the encoded message segments 310 and the decoder 405 may match, or otherwise identify, each coding sequence used to encode each encoded message segment 310. For example, the network entity may use a covariance based technique in the delay-Doppler domain to compare each received signal to each coding sequence in a codebook to determine which coding sequence was used to encode a particular message segment 310, for decoding of the message segment.

Based on the determined coding sequences, message segments may then be used to construct effective shared codebook 410. For example, based on the coding sequence used by a first UE, a first sub-codebook $A_1$ with size $M_dN_D \times M_dN_D$ may be constructed ($M_d$ is the number of delay bins, $N_D$ is the number of Doppler bins). Next, based on the coding sequence used by a second UE, a second sub-codebook $A_2$ with size $M_dN_D \times M_dN_D$ may be constructed and concatenated to sub-codebook $A_1$. This process may be continued for each UE sending a message 305. Effective shared codebook 410 may be constructed such that there are up to a number of P paths between a UE and network entity and may be a Gaussian matrix, a quadrature phase shift keying matrix, a Zaoff-Chu matrix, or any other similar sequences. Effective shared codebook 410 may be used to determine the contents of each encoded message segment 310.

Segment clusterer 415 may perform a clustering algorithm for assigning message segments with similar time delays and Doppler shifts to a same group, or delay Doppler domain cluster in a delay Doppler map. A subset of message segments that are all associated with a similar time delay and Doppler shift are assumed by the network entity to be transmitted by a same UE. The network entity may similarly cluster message segments from the other UEs into other delay Doppler domain clusters in the delay Doppler map, thereby indicating to the network entity which message segments are sent from a respective UE.

At message decoder 420, the message segments may be combined to collectively form the message transmitted by the single message for subsequent decoding and processing of the message. The network entity may compile each message by stitching, or combining, the message segments from each cluster according to the order the message segments were received over a set of slots and decode each segment according to the codebook. In some examples, the network entity may order the message segments according to the slot order received over the set of slots, for reassembling the message received from a particular UE.

Figure 5:
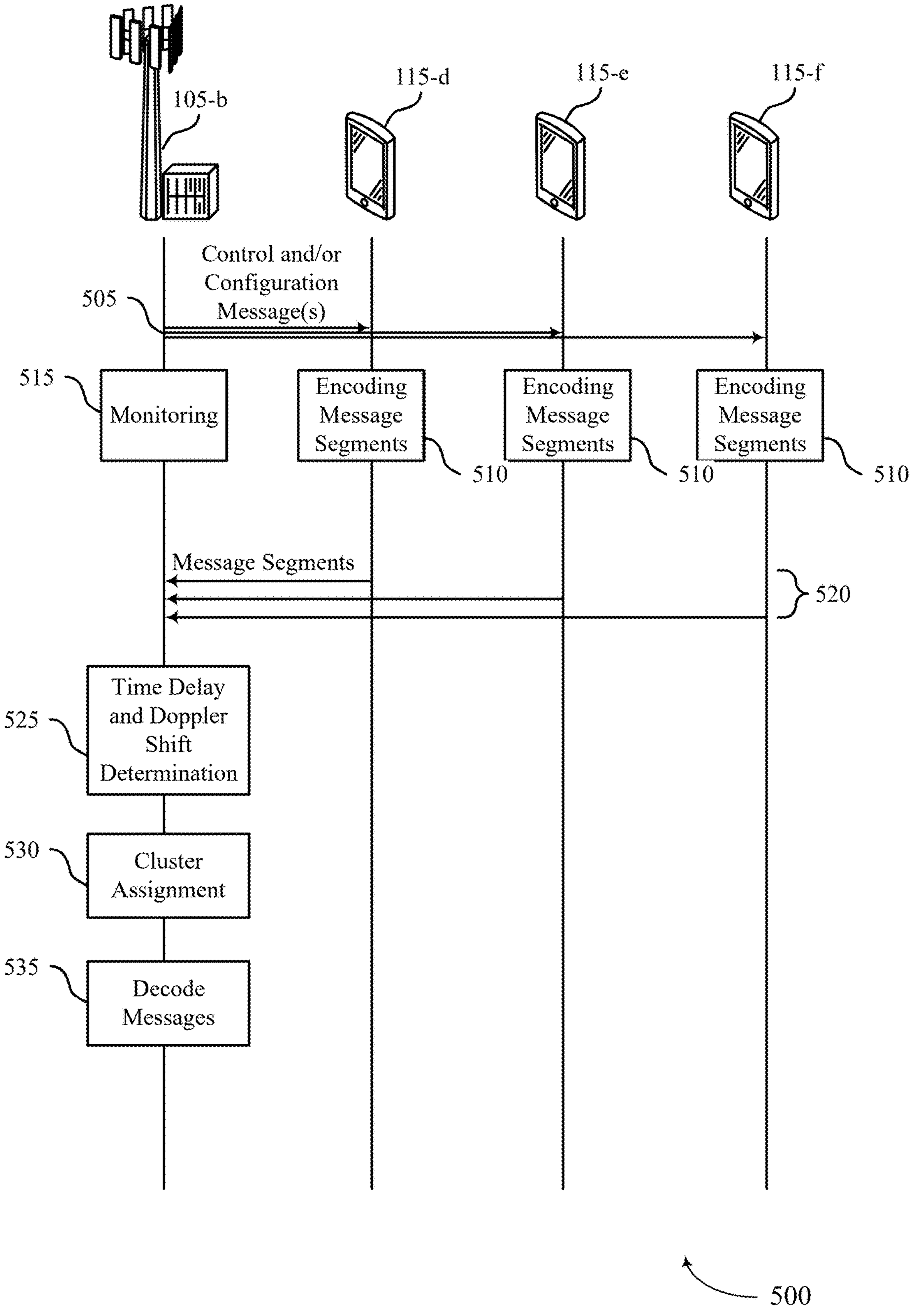
FIG. 5 shows an example of a process flow diagram that supports unsourced random access via channel clustering in orthogonal time frequency space domain in accordance with one or more aspects of the present disclosure.

FIG. 5 shows an example of a process flow diagram 500 that supports unsourced random access via channel clustering in orthogonal time frequency space domain in accordance with one or more aspects of the present disclosure.

Specifically, the process flow diagram 500 describes URA communications between a network entity 105-*b* and UEs 115 (e.g., UE 115-*d*, UE 115-*e*, UE 115-*f*), where network entity 105-*b* decodes the messages according to delay Doppler domain clustering. The process flow diagram 500 may implement, or be implemented by, one or more aspects of the wireless communications system 100, the wireless communications system 200, the message diagrams 300 and 400, or a combination thereof. Network entity 105-*b* may be an example of network entity 105 as described with reference to FIG. 1, and UEs 115 may be examples of the UE 115 as described with reference to FIG. 1.

In the following description of the process flow diagram 500, the operations may be performed in different orders or at different times. Some operations may also be left out of the process flow diagram 500, or other operations may be added. Although UE 115-*d*, UE 115-*e*, UE 115-*f*, and network entity 105-*b* are shown performing the operations of the process flow diagram 500, some aspects of some operations may also be performed by one or more other wireless devices.

At 505, the first wireless device (e.g., network entity 105-*b*) may output a control message indicating a codebook comprising multiple coding sequences. The network entity 105-*b* may output, to the multiple second wireless devices, a configuration message indicating the multiple slots.

At 510, UE 115-*d*, UE 115-*e*, and UE 115-*f* (e.g., second wireless devices) may encode multiple respective message segments using one or more coding sequences. UEs 115 may encode each respective message segment according to a different, randomly selected coding sequence of the codebook received in the control message.

At 515, the first wireless device (e.g., network entity 105-*b*) may monitor for messages from one or more second wireless devices (e.g., active users, UEs 115, UE-115 *d*, UE 115-*e*, and UE 115-*f*).

At 520, the first wireless device (e.g., network entity 105-*b*) may obtain (e.g., receive), from multiple second wireless devices (e.g., active users, UEs 115, UE-115 *d*, UE 115-*e*, and UE 115-*f*), multiple message segments via multiple slots.

At 525, the first wireless device (e.g., network entity 105-*b*) may determine respective time delays and Doppler shifts for each of the received message segments.

At 530, the first wireless device (e.g., network entity 105-*b*) may assign each message segment of the multiple message segments to a respective delay Doppler domain cluster of multiple delay Doppler domain clusters in a delay Doppler map, where each delay Doppler domain cluster collectively forms a message associated with a respective second wireless device.

At 535, the first wireless device (e.g., network entity 105-*b*) may decode messages from respective message segments that were sent from an associated UE 115. The decoding may be based on the respective message segments being a part of a same delay Doppler domain cluster and from a codebook shared between network entity 105-*b* and UEs 115.

Figure 6:
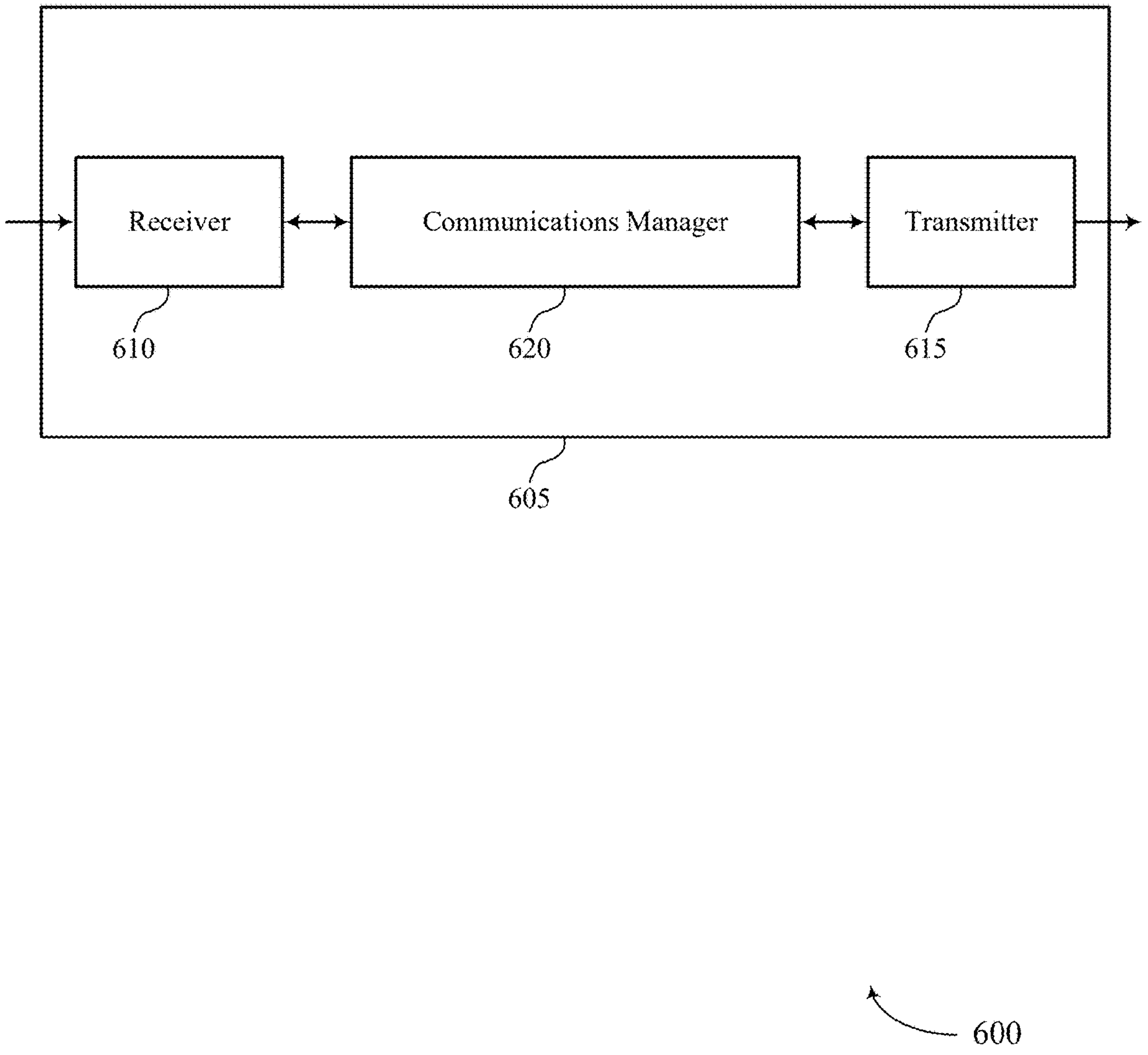
FIGS. 6 and 7 show block diagrams of devices that support unsourced random access via channel clustering in orthogonal time frequency space domain in accordance with one or more aspects of the present disclosure.

FIG. 6 shows a block diagram 600 of a device 605 that supports unsourced random access via channel clustering in orthogonal time frequency space domain in accordance with one or more aspects of the present disclosure. The device 605 may be an example of aspects of a network entity 105 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations or components thereof may be examples of means for performing various aspects of unsourced random access via channel clustering in orthogonal time frequency space domain as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for obtaining, from a set of multiple second wireless devices, a set of multiple message segments via a set of multiple slots. The communications manager 620 is capable of, configured to, or operable to support a means for assigning each message segment of the set of multiple message segments to a respective delay-Doppler (DD) domain cluster of a set of multiple DD domain clusters, where a first set of multiple message segments of the set of multiple message segments associated with a first DD domain cluster of the set of multiple DD domain clusters collectively forms a first message associated with a second wireless device of the set of multiple second wireless devices. The communications manager 620 is capable of, configured to, or operable to support a means for decoding the first message including the first set of multiple message segments based on a codebook shared with the set of multiple second wireless devices, the codebook based on a quantity of delay bins and a quantity of Doppler bins.

By including or configuring the communications manager 620 in accordance with examples as described herein, the device 605 (e.g., at least one processor controlling or otherwise coupled with the receiver 610, the transmitter 615, the communications manager 620, or a combination thereof) supports techniques which may result in various advantages, which may include reduced processing, reduced power consumption, and more efficient utilization of communication resources.

Figure 7:
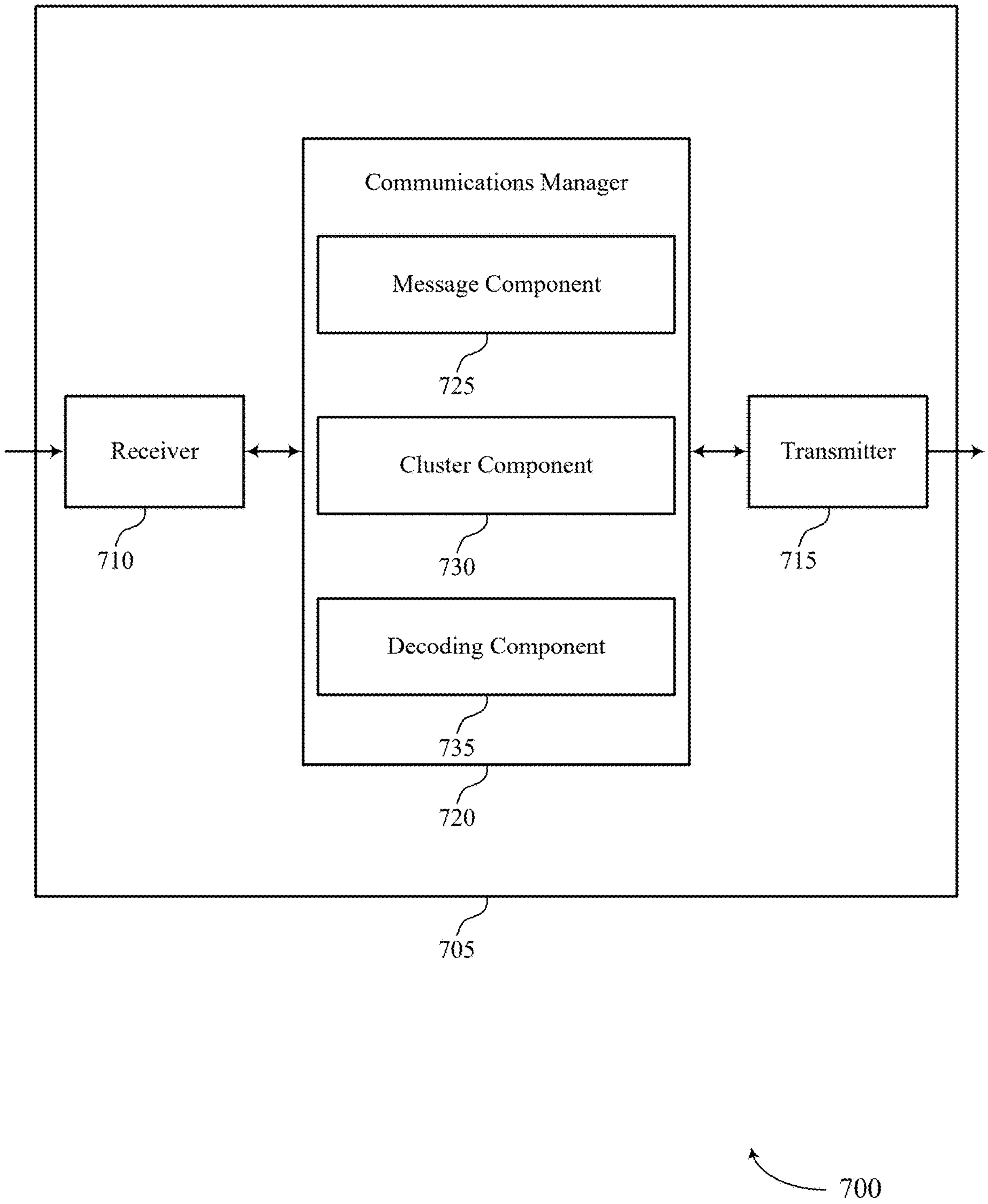

FIG. 7 shows a block diagram 700 of a device 705 that supports unsourced random access via channel clustering in orthogonal time frequency space domain in accordance with one or more aspects of the present disclosure. The device 705 may be an example of aspects of a device 605 or a network entity 105 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of unsourced random access via channel clustering in orthogonal time frequency space domain as described herein. For example, the communications manager 720 may include a Message component 725, a cluster component 730, a decoding component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The Message component 725 is capable of, configured to, or operable to support a means for obtaining, from a set of multiple second wireless devices, a set of multiple message segments via a set of multiple slots. The cluster component 730 is capable of, configured to, or operable to support a means for assigning each message segment of the set of multiple message segments to a respective delay-Doppler (DD) domain cluster of a set of multiple DD domain clusters, where a first set of multiple message segments of the set of multiple message segments associated with a first DD domain cluster of the set of multiple DD domain clusters collectively forms a first message associated with a second wireless device of the set of multiple second wireless devices. The decoding component 735 is capable of, configured to, or operable to support a means for decoding the first message including the first set of multiple message segments based on a codebook shared with the set of multiple second wireless devices, the codebook based on a quantity of delay bins and a quantity of Doppler bins.

Figure 8:
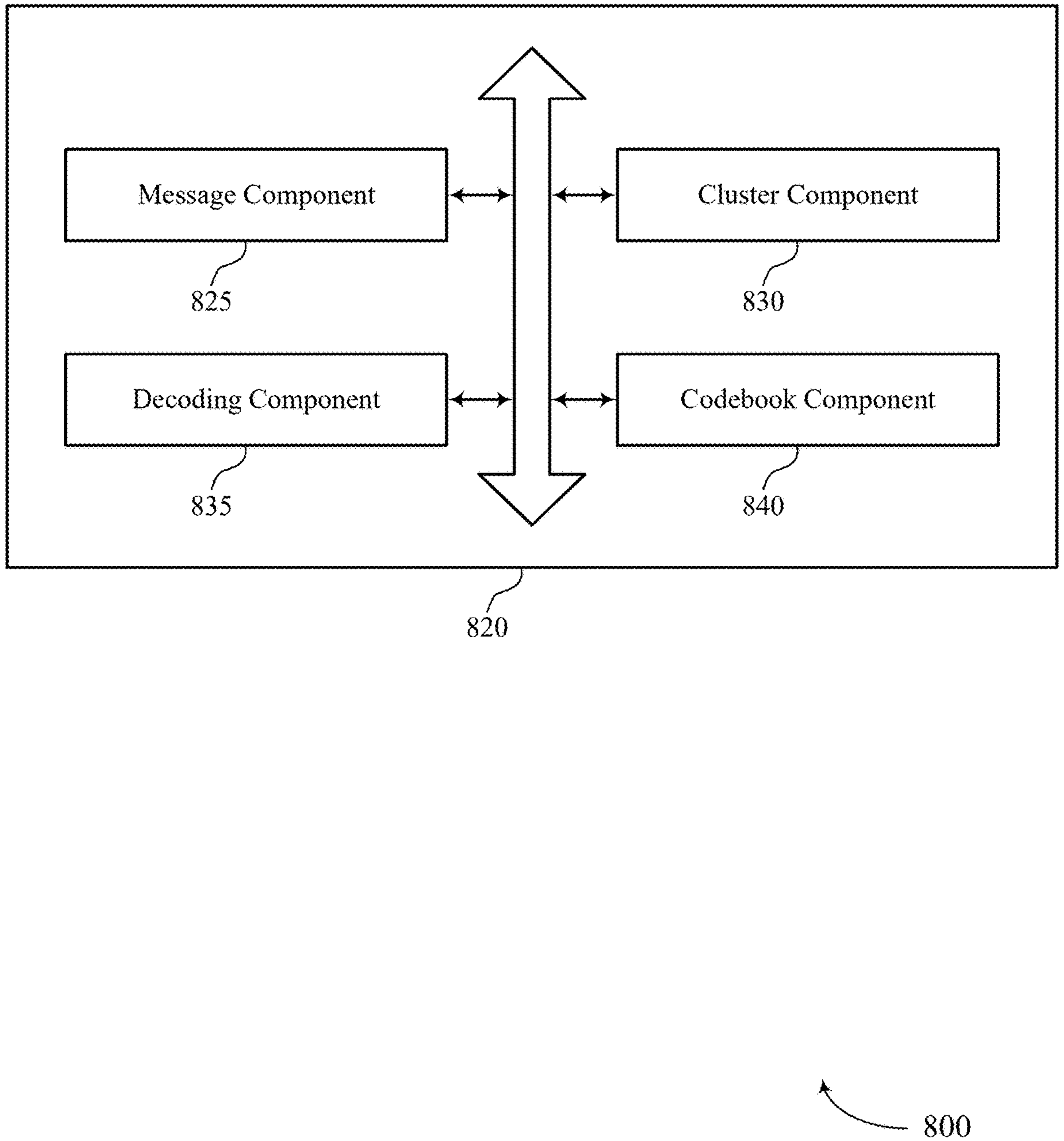
FIG. 8 shows a block diagram of a communications manager that supports unsourced random access via channel clustering in orthogonal time frequency space domain in accordance with one or more aspects of the present disclosure.

FIG. 8 shows a block diagram 800 of a communications manager 820 that supports unsourced random access via channel clustering in orthogonal time frequency space domain in accordance with one or more aspects of the present disclosure. The communications manager 820 may be an example of aspects of a communications manager 620, a communications manager 720, or both, as described herein. The communications manager 820, or various components thereof, may be an example of means for performing various aspects of unsourced random access via channel clustering in orthogonal time frequency space domain as described herein. For example, the communications manager 820 may include a Message component 825, a cluster component 830, a decoding component 835, a codebook component 840, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications in accordance with examples as disclosed herein. The Message component 825 is capable of, configured to, or operable to support a means for obtaining, from a set of multiple second wireless devices, a set of multiple message segments via a set of multiple slots. The cluster component 830 is capable of, configured to, or operable to support a means for assigning each message segment of the set of multiple message segments to a respective delay-Doppler (DD) domain cluster of a set of multiple DD domain clusters, where a first set of multiple message segments of the set of multiple message segments associated with a first DD domain cluster of the set of multiple DD domain clusters collectively forms a first message associated with a second wireless device of the set of multiple second wireless devices. The decoding component 835 is capable of, configured to, or operable to support a means for decoding the first message including the first set of multiple message segments based on a codebook shared with the set of multiple second wireless devices, the codebook based on a quantity of delay bins and a quantity of Doppler bins.

In some examples, the codebook component 840 is capable of, configured to, or operable to support a means for outputting a control message indicating the codebook including a set of multiple coding sequences, where the first DD domain cluster is associated with a set of coding sequences of the set of multiple coding sequences.

In some examples, a first message segment of the first set of multiple message segments is coded using a first coding sequence of the set of coding sequences and a second message segment of the first set of multiple message segments is coded using a second coding sequence of the set of coding sequences.

In some examples, the first coding sequence and the second coding sequence are randomly selected sequences from a column of the set of coding sequences.

In some examples, the Message component 825 is capable of, configured to, or operable to support a means for determining a time delay and a Doppler shift for each respective message segment of the set of multiple message segments. In some examples, the cluster component 830 is capable of, configured to, or operable to support a means for assigning each message segment of the set of multiple message segments to a respective DD cluster of the set of multiple DD clusters based on the determined time delay and Doppler shift for each respective message segment, where each DD cluster corresponds to a respective wireless device of the set of multiple second wireless devices.

In some examples, a quantity of the first set of multiple message segments is based on a quantity of the set of multiple slots.

In some examples, the first wireless device is a network entity, and the set of multiple second wireless devices includes a set of multiple user equipments.

Figure 9:
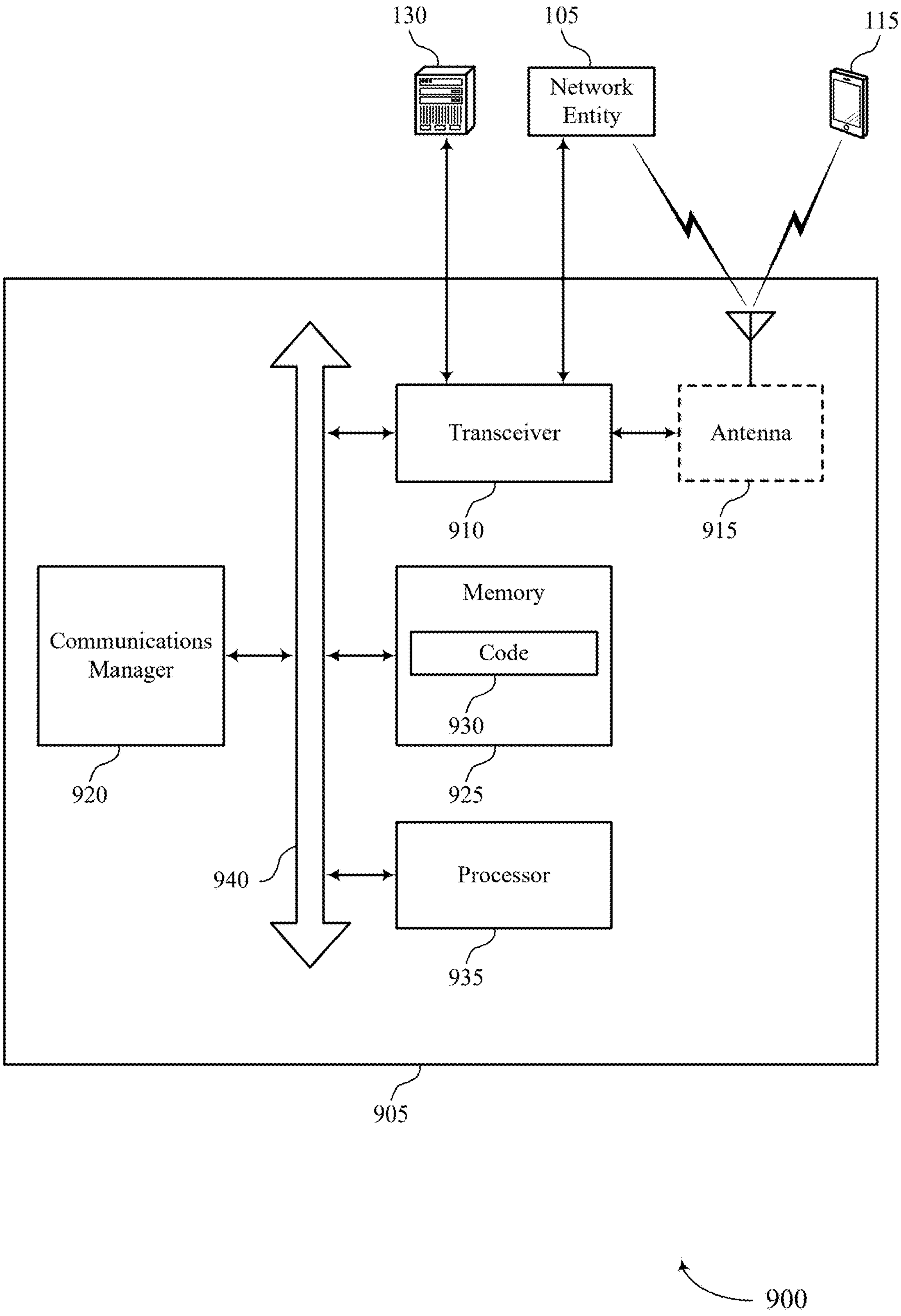
FIG. 9 shows a diagram of a system including a device that supports unsourced random access via channel clustering in orthogonal time frequency space domain in accordance with one or more aspects of the present disclosure.

FIG. 9 shows a diagram of a system 900 including a device 905 that supports unsourced random access via channel clustering in orthogonal time frequency space domain in accordance with one or more aspects of the present disclosure. The device 905 may be an example of or include components of a device 605, a device 705, or a network entity 105 as described herein. The device 905 may communicate with other network devices or network equipment such as one or more of the network entities 105, UEs 115, or any combination thereof. The communications may include communications over one or more wired interfaces, over one or more wireless interfaces, or any combination thereof. The device 905 may include components that support outputting and obtaining communications, such as a communications manager 920, a transceiver 910, one or more antennas 915, at least one memory 925, code 930, and at least one processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or one or more memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or one or more memory components (e.g., the at least one processor 935, the at least one memory 925, or both), may be included in a chip or chip assembly that is installed in the device 905. In some examples, the transceiver 910 may be operable to support communications via one or more communications links (e.g., communication link(s) 125, backhaul communication link(s) 120, a midhaul communication link 162, a fronthaul communication link 168).

The at least one memory 925 may include RAM, ROM, or any combination thereof. The at least one memory 925 may store computer-readable, computer-executable, or processor-executable code, such as the code 930. The code 930 may include instructions that, when executed by one or more of the at least one processor 935, cause the device 905 to perform various functions described herein. The code 930 may be stored in a non-transitory computer-readable medium such as system memory or another type of memory. In some cases, the code 930 may not be directly executable by a processor of the at least one processor 935 but may cause a computer (e.g., when compiled and executed) to perform functions described herein. In some cases, the at least one memory 925 may include, among other things, a BIOS which may control basic hardware or software operation such as the interaction with peripheral components or devices. In some examples, the at least one processor 935 may include multiple processors and the at least one memory 925 may include multiple memories. One or more of the multiple processors may be coupled with one or more of the multiple memories which may, individually or collectively, be configured to perform various functions herein (for example, as part of a processing system).

The at least one processor 935 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 935 may be configured to operate a memory array using a memory controller. In some other cases, a memory controller may be integrated into one or more of the at least one processor 935. The at least one processor 935 may be configured to execute computer-readable instructions stored in a memory (e.g., one or more of the at least one memory 925) to cause the device 905 to perform various functions (e.g., functions or tasks supporting unsourced random access via channel clustering in orthogonal time frequency space domain). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (e.g., one or more physical nodes and supporting software such as operating systems, virtual machines, or container instances) that may host the functions (e.g., by executing code 930) to perform the functions of the device 905. The at least one processor 935 may be any one or more suitable processors capable of executing scripts or instructions of one or more software programs stored in the device 905 (such as within one or more of the at least one memory 925).

In some examples, the at least one processor 935 may include multiple processors and the at least one memory 925 may include multiple memories. One or more of the multiple processors may be coupled with one or more of the multiple memories, which may, individually or collectively, be configured to perform various functions herein. In some examples, the at least one processor 935 may be a component of a processing system, which may refer to a system (such as a series) of machines, circuitry (including, for example, one or both of processor circuitry (which may include the at least one processor 935) and memory circuitry (which may include the at least one memory 925)), or components, that receives or obtains inputs and processes the inputs to produce, generate, or obtain a set of outputs. The processing system may be configured to perform one or more of the functions described herein. For example, the at least one processor 935 or a processing system including the at least one processor 935 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 925 or otherwise, to perform one or more of the functions described herein.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the at least one memory 925, the code 930, and the at least one processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with one or more other network entities 105, and may include a controller or scheduler for controlling communications with UEs 115 (e.g., in cooperation with the one or more other network devices). In some examples, the communications manager 920 may support an X2 interface within an LTE/LTE-A wireless communications network technology to provide communication between network entities 105.

The communications manager 920 may support wireless communications in accordance with examples as disclosed herein. For example, the communications manager 920 is capable of, configured to, or operable to support a means for obtaining, from a set of multiple second wireless devices, a set of multiple message segments via a set of multiple slots. The communications manager 920 is capable of, configured to, or operable to support a means for assigning each message segment of the set of multiple message segments to a respective delay-Doppler (DD) domain cluster of a set of multiple DD domain clusters, where a first set of multiple message segments of the set of multiple message segments associated with a first DD domain cluster of the set of multiple DD domain clusters collectively forms a first message associated with a second wireless device of the set of multiple second wireless devices. The communications manager 920 is capable of, configured to, or operable to support a means for decoding the first message including the first set of multiple message segments based on a codebook shared with the set of multiple second wireless devices, the codebook based on a quantity of delay bins and a quantity of Doppler bins.

By including or configuring the communications manager 920 in accordance with examples as described herein, the device 905 supports techniques which may result in various advantages, which may include reduced processing, reduced power consumption, and more efficient utilization of communication resources.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, one or more of the at least one processor 935, one or more of the at least one memory 925, the code 930, or any combination thereof (for example, by a processing system including at least a portion of the at least one processor 935, the at least one memory 925, the code 930, or any combination thereof). For example, the code 930 may include instructions executable by one or more of the at least one processor 935 to cause the device 905 to perform various aspects of unsourced random access via channel clustering in orthogonal time frequency space domain as described herein, or the at least one processor 935 and the at least one memory 925 may be otherwise configured to, individually or collectively, perform or support such operations.

Figure 10:
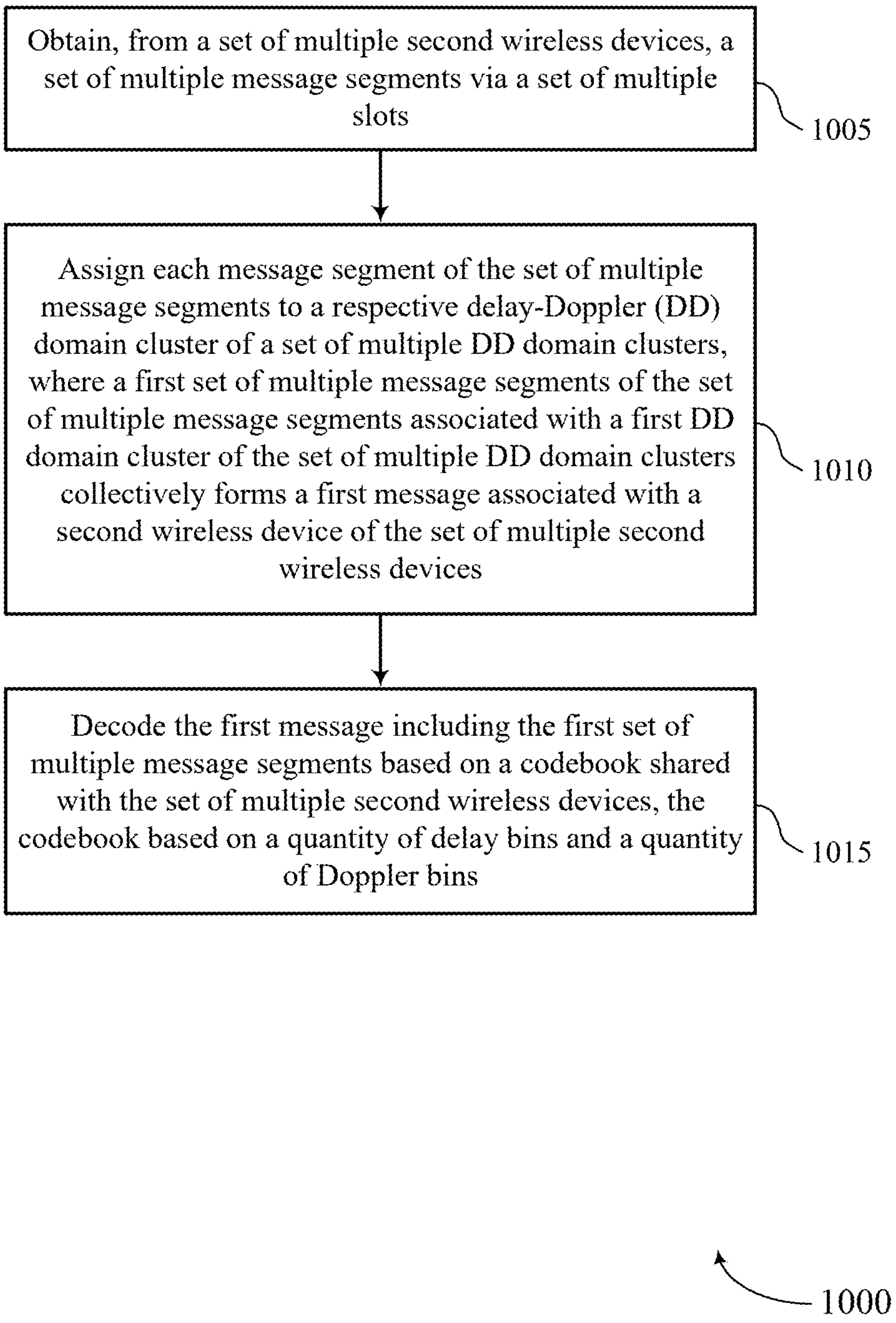
FIG. 10 shows a flowchart illustrating methods that support unsourced random access via channel clustering in orthogonal time frequency space domain in accordance with one or more aspects of the present disclosure.

FIG. 10 shows a flowchart illustrating a method 1000 that supports unsourced random access via channel clustering in orthogonal time frequency space domain in accordance with one or more aspects of the present disclosure. The operations of the method 1000 may be implemented by a network entity or its components as described herein. For example, the operations of the method 1000 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1005, the method may include obtaining, from a set of multiple second wireless devices, a set of multiple message segments via a set of multiple slots. The operations of 1005 may be performed in accordance with examples as disclosed herein. In some examples, aspects of the operations of 1005 may be performed by a Message component 825 as described with reference to FIG. 8.

At 1010, the method may include assigning each message segment of the set of multiple message segments to a respective delay-Doppler (DD) domain cluster of a set of multiple DD domain clusters, where a first set of multiple message segments of the set of multiple message segments associated with a first DD domain cluster of the set of multiple DD domain clusters collectively forms a first message associated with a second wireless device of the set of multiple second wireless devices. The operations of 1010 may be performed in accordance with examples as disclosed herein. In some examples, aspects of the operations of 1010 may be performed by a cluster component 830 as described with reference to FIG. 8.

At 1015, the method may include decoding the first message including the first set of multiple message segments based on a codebook shared with the set of multiple second wireless devices, the codebook based on a quantity of delay bins and a quantity of Doppler bins. The operations of 1015 may be performed in accordance with examples as disclosed herein. In some examples, aspects of the operations of 1015 may be performed by a decoding component 835 as described with reference to FIG. 8.

The following provides an overview of aspects of the present disclosure:

Aspect 1: A method for wireless communications at a first wireless device, comprising: obtaining, from a plurality of second wireless devices, a plurality of message segments via a plurality of slots; assigning each message segment of the plurality of message segments to a respective delay-Doppler (DD) domain cluster of a plurality of DD domain clusters, wherein a first plurality of message segments of the plurality of message segments associated with a first DD domain cluster of the plurality of DD domain clusters collectively forms a first message associated with a second wireless device of the plurality of second wireless devices; and decoding the first message comprising the first plurality of message segments based at least in part on a codebook shared with the plurality of second wireless devices, the codebook based at least in part on a quantity of delay bins and a quantity of Doppler bins.

Aspect 2: The method of aspect 1, further comprising: outputting a control message indicating the codebook comprising a plurality of coding sequences, wherein the first DD domain cluster is associated with a set of coding sequences of the plurality of coding sequences.

Aspect 3: The method of aspect 2, wherein a first message segment of the first plurality of message segments is coded using a first coding sequence of the set of coding sequences and a second message segment of the first plurality of message segments is coded using a second coding sequence of the set of coding sequences.

Aspect 4: The method of aspect 3, wherein the first coding sequence and the second coding sequence are randomly selected sequences from a column of the set of coding sequences.

Aspect 5: The method of any of aspects 1 through 4, further comprising: determining a time delay and a Doppler shift for each respective message segment of the plurality of message segments; and assigning each message segment of the plurality of message segments to a respective DD cluster of the plurality of DD clusters based at least in part on the determined time delay and Doppler shift for each respective message segment, wherein each DD cluster corresponds to a respective wireless device of the plurality of second wireless devices.

Aspect 6: The method of any of aspects 1 through 5, wherein a quantity of the first plurality of message segments is based at least in part on a quantity of the plurality of slots.

Aspect 7: The method of any of aspects 1 through 6, wherein the first wireless device is a network entity, and the plurality of second wireless devices comprises a plurality of user equipments.

Aspect 8: A first wireless device for wireless communications, comprising one or more memories storing processor-executable code, and one or more processors coupled with the one or more memories and individually or collectively operable to execute the code to cause the first wireless device to perform a method of any of aspects 1 through 7.

Aspect 9: A first wireless device for wireless communications, comprising at least one means for performing a method of any of aspects 1 through 7.

Aspect 10: A non-transitory computer-readable medium storing code for wireless communications, the code comprising instructions executable by one or more processors to perform a method of any of aspects 1 through 7.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device, comprising:

one or more memories storing processor-executable code; and one or more processors coupled with the one or more memories and individually or collectively operable to execute the code to cause the first wireless device to:

obtain, from a plurality of second wireless devices, a plurality of message segments via a plurality of slots;

assign each message segment of the plurality of message segments to a respective delay-Doppler (DD) domain cluster of a plurality of DD domain clusters based at least in part on respective message segments of the respective DD domain clusters having similar time delay and Doppler shift characteristics, wherein a first plurality of message segments of the plurality of message segments associated with a first DD domain cluster of the plurality of DD domain clusters collectively forms a first message associated with unsourced random access operations corresponding to a second wireless device of the plurality of second wireless devices; and decode the first message comprising the first plurality of message segments based at least in part on a codebook shared with the plurality of second wireless devices, the codebook based at least in part on a quantity of delay bins and a quantity of Doppler bins.

2. The first wireless device of claim 1, wherein the one or more processors are individually or collectively further operable to execute the code to cause the first wireless device to:

output a control message indicating the codebook comprising a plurality of coding sequences, wherein the first DD domain cluster is associated with a set of coding sequences of the plurality of coding sequences.

3. The first wireless device of claim 2, wherein a first message segment of the first plurality of message segments is coded using a first coding sequence of the set of coding sequences and a second message segment of the first plurality of message segments is coded using a second coding sequence of the set of coding sequences.

4. The first wireless device of claim 3, wherein the first coding sequence and the second coding sequence are randomly selected sequences from a column of the set of coding sequences.

5. The first wireless device of claim 1, wherein the one or more processors are individually or collectively further operable to execute the code to cause the first wireless device to:

determine a time delay and a Doppler shift for each respective message segment of the plurality of message segments; and assign each message segment of the plurality of message segments to a respective DD cluster of the plurality of DD clusters based at least in part on the determined time delay and Doppler shift for each respective message segment, wherein each DD cluster corresponds to a respective wireless device of the plurality of second wireless devices.

6. The first wireless device of claim 1, wherein a quantity of the first plurality of message segments is based at least in part on a quantity of the plurality of slots.

7. The first wireless device of claim 1, wherein the first wireless device is a network entity, and the plurality of second wireless devices comprises a plurality of user equipment.

8. A method for wireless communications at a first wireless device, comprising:

obtaining, from a plurality of second wireless devices, a plurality of message segments via a plurality of slots;

assigning each message segment of the plurality of message segments to a respective delay-Doppler (DD) domain cluster of a plurality of DD domain clusters based at least in part on respective message segments of the respective DD domain clusters having similar time delay and Doppler shift characteristics, wherein a first plurality of message segments of the plurality of message segments associated with a first DD domain cluster of the plurality of DD domain clusters collectively forms a first message associated with unsourced random access operations corresponding to a second wireless device of the plurality of second wireless devices; and decoding the first message comprising the first plurality of message segments based at least in part on a codebook shared with the plurality of second wireless devices, the codebook based at least in part on a quantity of delay bins and a quantity of Doppler bins.

9. The method of claim 8, further comprising:

outputting a control message indicating the codebook comprising a plurality of coding sequences, wherein the first DD domain cluster is associated with a set of coding sequences of the plurality of coding sequences.

10. The method of claim 9, wherein a first message segment of the first plurality of message segments is coded using a first coding sequence of the set of coding sequences and a second message segment of the first plurality of message segments is coded using a second coding sequence of the set of coding sequences.

11. The method of claim 10, wherein the first coding sequence and the second coding sequence are randomly selected sequences from a column of the set of coding sequences.

12. The method of claim 8, further comprising:

determining a time delay and a Doppler shift for each respective message segment of the plurality of message segments; and assigning each message segment of the plurality of message segments to a respective DD cluster of the plurality of DD clusters based at least in part on the determined time delay and Doppler shift for each respective message segment, wherein each DD cluster corresponds to a respective wireless device of the plurality of second wireless devices.

13. The method of claim 8, wherein a quantity of the first plurality of message segments is based at least in part on a quantity of the plurality of slots.

14. The method of claim 8, wherein the first wireless device is a network entity, and the plurality of second wireless devices comprises a plurality of user equipment.

15. A first wireless device for wireless communications, comprising:

means for obtaining, from a plurality of second wireless devices, a plurality of message segments via a plurality of slots;

means for assigning each message segment of the plurality of message segments to a respective delay-Doppler (DD) domain cluster of a plurality of DD domain clusters based at least in part on respective message segments of the respective DD domain clusters having similar time delay and Doppler shift characteristics, wherein a first plurality of message segments of the plurality of message segments associated with a first DD domain cluster of the plurality of DD domain clusters collectively forms a first message associated with unsourced random access operations corresponding to a second wireless device of the plurality of second wireless devices; and means for decoding the first message comprising the first plurality of message segments based at least in part on a codebook shared with the plurality of second wireless devices, the codebook based at least in part on a quantity of delay bins and a quantity of Doppler bins.

16. The first wireless device of claim 15, further comprising:

means for outputting a control message indicating the codebook comprising a plurality of coding sequences, wherein the first DD domain cluster is associated with a set of coding sequences of the plurality of coding sequences.

17. The first wireless device of claim 16, wherein a first message segment of the first plurality of message segments is coded using a first coding sequence of the set of coding sequences and a second message segment of the first plurality of message segments is coded using a second coding sequence of the set of coding sequences.

18. The first wireless device of claim 17, wherein the first coding sequence and the second coding sequence are randomly selected sequences from a column of the set of coding sequences.

19. The first wireless device of claim 15, further comprising:

means for determining a time delay and a Doppler shift for each respective message segment of the plurality of message segments; and means for assigning each message segment of the plurality of message segments to a respective DD cluster of the plurality of DD clusters based at least in part on the determined time delay and Doppler shift for each respective message segment, wherein each DD cluster corresponds to a respective wireless device of the plurality of second wireless devices.

20. The first wireless device of claim 15, wherein a quantity of the first plurality of message segments is based at least in part on a quantity of the plurality of slots.

21. The first wireless device of claim 15, wherein the first wireless device is a network entity, and the plurality of second wireless devices comprises a plurality of user equipment.

22. A non-transitory computer-readable medium storing code for wireless communications, the code comprising instructions executable by one or more processors to:

obtain, from a plurality of second wireless devices, a plurality of message segments via a plurality of slots;

assign each message segment of the plurality of message segments to a respective delay-Doppler (DD) domain cluster of a plurality of DD domain clusters based at least in part on respective message segments of the respective DD domain clusters having similar time delay and Doppler shift characteristics, wherein a first plurality of message segments of the plurality of message segments associated with a first DD domain cluster of the plurality of DD domain clusters collectively forms a first message associated with unsourced random access operations corresponding to a second wireless device of the plurality of second wireless devices; and decode the first message comprising the first plurality of message segments based at least in part on a codebook shared with the plurality of second wireless devices, the codebook based at least in part on a quantity of delay bins and a quantity of Doppler bins.

23. The non-transitory computer-readable medium of claim 22, wherein the instructions are further executable by the one or more processors to:

output a control message indicating the codebook comprising a plurality of coding sequences, wherein the first DD domain cluster is associated with a set of coding sequences of the plurality of coding sequences.

24. The non-transitory computer-readable medium of claim 23, wherein a first message segment of the first plurality of message segments is coded using a first coding sequence of the set of coding sequences and a second message segment of the first plurality of message segments is coded using a second coding sequence of the set of coding sequences.

25. The non-transitory computer-readable medium of claim 24, wherein the first coding sequence and the second coding sequence are randomly selected sequences from a column of the set of coding sequences.

26. The non-transitory computer-readable medium of claim 22, wherein the instructions are further executable by the one or more processors to:

determine a time delay and a Doppler shift for each respective message segment of the plurality of message segments; and assign each message segment of the plurality of message segments to a respective DD cluster of the plurality of DD clusters based at least in part on the determined time delay and Doppler shift for each respective message segment, wherein each DD cluster corresponds to a respective wireless device of the plurality of second wireless devices.

27. The non-transitory computer-readable medium of claim 22, wherein a quantity of the first plurality of message segments is based at least in part on a quantity of the plurality of slots.

28. The non-transitory computer-readable medium of claim 22, wherein the first wireless device is a network entity, and the plurality of second wireless devices comprises a plurality of user equipment.

* * * * *